Sept. 13, 1932.  F. J. EISENHARDT  1,877,651
PROCESS OF MAKING BRAKE LINING AND THE LIKE
Original Filed May 24, 1924
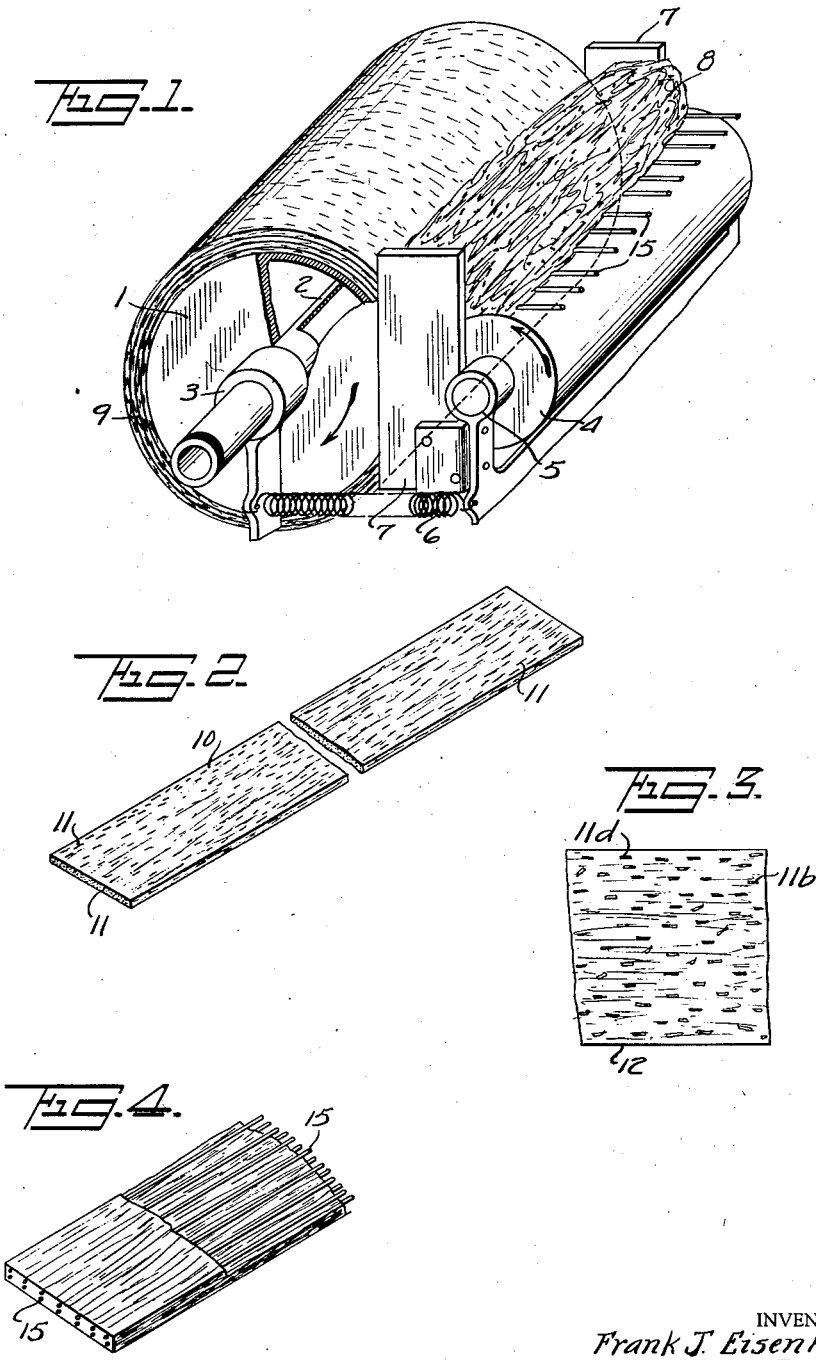
INVENTOR
Frank J. Eisenhardt
BY
ATTORNEY Patented Sept. 13, 1932

1,877,651

UNITED STATES PATENT OFFICE

FRANK J. EISENHARDT, OF WAUKEGAN, ILLINOIS, ASSIGNOR TO JOHNS-MANVILLE CORPORATION, A CORPORATION OF NEW YORK

PROCESS OF MAKING BRAKE LINING AND THE LIKE

Original application filed May 24, 1924, Serial No. 715,715. Divided and this application filed October 21, 1927. Serial No. 227,685.

This application is a division of my prior application, Serial No. 715,715, filed May 24, 1924, which has become Patent No. 1,771,749.

This invention relates to the production of sheets or slabs of material suitable for brake linings and the like in which toughness and great durability are required. It comprises a process for forming a composite material having short bits of wire or fibre or both embedded in an originally plastic matrix and so disposed therein as to exert the most beneficial effect thereon as a binding material. Preferably I use a rubber compound for the matrix and a multiplicity of short bits of asbestos fibre as the binder, but other materials having characteristics of the same general type could be used.

According to the process herein described, short bits of asbestos or other fibre, or wire, if desired, are mixed first with a plastic compound having rubber as a base and any suitable filler, and a proper proportion of sulphur, if the product is to be vulcanized in any suitable apparatus, such as a Charles Ross mixer. The plastic mass so formed is then transferred to a sheet forming machine which consists essentially of a large roll or drum, made hollow so that it can be heated, and a cooperating smaller roll, unheated, the two being forced together by yielding pressure and revolved in opposite directions so that any mass of plastic material placed above and between them is gradually drawn downwards and a thin layer thereof is sheared from mass and formed on the hot roll or drum to which it will adhere because said drum is hot. The heat of the drum also initiates a vulcanizing action between the rubber and sulphur in the mass being treated. As the rolls revolve a spiral layer or film is wound up on the hot drum, and the successive coils thereof are merged into, and united to form, a homogeneous circular sheet by the pressure of the cold, smaller roll, to which none of the material will adhere. This partially vulcanizes the sheet.

In this way sheets of great density, homogeneity and uniformity may be formed up to half an inch in thickness and more. There is difficulty in getting sufficient heat to the surface of the sheet to carry on the process beyond an as yet undetermined maximum thickness of sheet.

The sheets when formed to the desired thickness are cut from the drum, given the proper shape for brake linings and the like, and, if sulphur has been incorporated, they are then, if desired, further vulcanized in the usual way.

The main feature of advantage in my invention, so far as the characteristics of the product are concerned, results from the fact that during the kneading of the plastic mass resting on and between the revolving rolls the short bits of asbestos, or other fibres or elongated binding materials, are nearly all arranged in planes tangential to the surfaces of the rolls at or before the moment they pass between the rolls, so that in the completed sheet they are found lying in planes substantially parallel to the surfaces of the sheet. This produces a sheet of relatively high tensile strength combined with flexibility, the multiplicity of bits of fibre or other material thus arranged acting much like the large number of small bones in a shad. Moreover, the sucking, pulling or shearing action of the rolls on the material tends to straighten out a considerable portion of the bits of fibre along the line of their travel between the rolls, so that when they become embedded in the resulting sheet they lie in planes substantially perpendicular to the axis of the heated drum, and consequently are parallel to the side edges of the completed sheets formed on said drum. As a result such sheets have twice the tensile strength in this direction that they have against lateral stresses. When strips are cut from the sheets so as to have this greater strength in the direction of their lengths, it makes them particularly valuable as brake linings or the like.

In the accompanying sheet of drawing,

Fig. 1 is a perspective view of a simple form of apparatus which may be used in carrying out the process of my invention, parts being broken away.

Fig. 2 is a similar view of a brake lining constituting one product of my invention.

Fig. 3 is a diagrammatic view of a sheet of my improved material showing the bits of contained wire exaggerated in size for clearness, and Fig. 4 is a perspective view of a portion of brake linings with parts broken away to show the continuous wires which have been exaggerated in size for clearness of illustration.

In the drawing 1 is the larger roll or hollow drum which may be heated by steam admitted through its hollow shaft 2, journaled in bearings, one of which is shown at 3. The smaller, cold roll 4 is journaled in bearing 5, and the two are pressed together by spring 6, both journal bearings being carried in housings pivoted at their lower ends, which are not shown, being broken away in the drawing. End boards 7, 7, or other convenient guides are employed to keep the plastic mass 8 from running out at the ends of the rolls. When these rolls are rotated in the directions indicated by the arrows the mass 8 is slowly dragged down between them and adheres to the heated roll 1 in a thin compact layer or film which is gradually wound on the drum in a spiral 9, the coils of which spiral coalesce and merge, under roll pressure, into a homogeneous sheet of uniform thickness. When the desired thickness of sheet is thus attained, the rolls are stopped and separated and the sheet of material on roll 1 is slit transversely along a line parallel to its axis, removed from the drum and developed into a flat sheet which is then cut into the desired form, and completely vulcanized if sulphur has been used.

10, Fig. 2 is such a strip suitable for use as a brake lining. The bits of binding material are indicated generally at 11, 11, lying substantially parallel to the longer dimension of the lining.

In Fig. 3 bits of wire in a sheet 12 are indicated by 11d, while the bits of fibre are indicated at 11b.

In some cases where sheets were being made according to my invention it has happened that such a sheet will drop away from the under side of the drum after a certain thickness has been reached in building it up, and so produce wrinkles and blisters or other uneven characteristics in the product. To overcome this I may run continuous wires, yarn or threads 15 into the mass 8 and let them wind up in spirals in the sheet of material formed on the drum. These reenforcing wires or threads prevent the sheet from falling away from the drum. Also when material so reenforced is cut from the drum these long wires or threads, then found embedded therein and running lengthwise thereof, add to its tensile strength, said wires lying in the strip or sheet so formed in a plurality of planes.

Taking, as an example, a mixture composed of 75 parts by weight of chopped-up and shredded fragments of asbestos yarn, or other forms of fibre, 25 parts by weight of a mixture of rubber and zinc oxide in equal proportions, by weight, and the proper amount of sulphur, and treating the same according to the above described process, including vulcanization, there will result a dense, tough, elastic sheet having a hardness of from 15 to 25 on the Brinnell scale according to the extent of vulcanization and a coefficient of friction on steel of 50%, which is considerably higher than that of the average asbestos brake lining. Such product is resistant to oil and has a low water absorption rate,—in short it is a material possessing all the desirable qualities of a brake lining to a very high degree.

In some forms of the product vulcanization may be omitted, and of course the proportions and nature of the constituents may be varied to produce different degrees of hardness, flexibility and other qualities.

Short bits of wire and fibre have previously been embedded in a suitable matrix to form a plastic composition which has been molded in mass form, but in such process the even density resulting from the building up process here described cannot be obtained, nor the even distribution of the wire and fibre in the mass, and the feature of arranging the bits of wire in planes parallel to the surfaces of the sheet, and largely parallel one to another, cannot be secured. Also the proper introduction and arrangement of the continuous wires 15, are practically impossible in such prior process.

Furthermore, prior to this invention, it was impossible to make brake blocks under one-quarter inch in thickness, whereas with this process the thinness of the strip of sheet desired presents no difficulty in making it of uniform density, hardness and strength.

Having described my invention, I claim:

1. A process of producing brake lining material consisting of a sheet, which process includes, spirally winding layers of a compound subject to be hardened by heat together with reenforcing substance, while applying heat at the interior of said spiral winding and pressure at the exterior thereof.

2. A process of producing brake lining material consisting of a sheet, which process includes, spirally winding layers of a compound of rubber and reenforcing substance, while applying heat at the interior of said spiral winding and pressure at the exterior thereof.

3. A process of producing brake lining material which process includes, spirally winding layers of a compound subject to be hardened by heat together with reenforcing substance, while applying heat at the interior of said spiral winding and pressure at the exterior thereof; cutting the winding into segments suitable for brake lining, and vulcanizing the segments to impart the strength and hardness requisite in a brake lining material.

4. A process of producing brake lining material which process includes, spirally winding layers of a compound of rubber and reenforcing substance, while applying heat at the interior of said spiral winding and pressure at the exterior thereof; cutting the winding into segments suitable for brake lining, and vulcanizing the segments to impart the strength and hardness requisite in a brake lining material.

5. A process of producing a brake lining material consisting in drawing a continuous layer from a mass of suitable ingredients; subjecting the layer to pressure; repassing such layer in contact with the mass to withdraw further material therefrom to increase the thickness of the layer, repeating such operations until a layer of material of the desired thickness is obtained; supplying heat at the interior of the layer during the formation thereof; cutting the layer into segments suitable for brake lining; and vulcanizing the segments to impart the strength and hardness requisite in a brake lining material.

6. A process of producing brake lining material, which process includes mixing short lengths of heat resistant reenforcing substance in a rubber compound subject to be hardened by heat, shearing and withdrawing a thin continuous layer from a mass of said mixture, thereby arranging the short lengths of reenforcing substance generally longitudinally to the side edges of the layer, repassing said continuous layer in contact with the mass to shear and withdraw another similar layer from the mass, and repeating the latter operation until the layers form a sheet of the desired thickness and supplying heat at the interior of said sheet during the formation thereof, cutting the sheet into segments suitable for brake lining, and vulcanizing the segments to impart the strength and hardness requisite in brake lining material.

7. A process of producing a brake lining material consisting in drawing a continuous layer from a mass of suitable ingredients; subjecting the layer to pressure; repeating such operations until a layer of material of the desired thickness is obtained; supplying heat to one side of the layer during the formation thereof, cutting the layer into strips suitable for brake lining; shaping the strips to conform to the surface to be lined and vulcanizing the strips.

FRANK J. EISENHARDT.